(12) United States Patent
Landry et al.

(10) Patent No.: US 12,552,707 B2
(45) Date of Patent: Feb. 17, 2026

(54) THERMALLY CONDUCTIVE CEMENTS AND METHODS FOR USE THEREOF

(71) Applicant: Schlumberger Technology Corporation, Sugar Land, TX (US)

(72) Inventors: Geoffrey Landry, Richmond, TX (US); William Troy Huey, Denver, CO (US); Ian Corey, Von Ormy, TX (US); Mark Meade, Katy, TX (US); Christopher Parton, Rosenberg, TX (US); Nathan Fischer, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 6 days.

(21) Appl. No.: 18/726,850

(22) PCT Filed: Apr. 20, 2023

(86) PCT No.: PCT/US2023/019258
§ 371 (c)(1),
(2) Date: Jul. 5, 2024

(87) PCT Pub. No.: WO2023/205327
PCT Pub. Date: Oct. 26, 2023

(65) Prior Publication Data
US 2025/0162939 A1 May 22, 2025

Related U.S. Application Data

(60) Provisional application No. 63/363,357, filed on Apr. 21, 2022.

(51) Int. Cl.
| | | |
|---|---|---|
| C04B 14/02 | (2006.01) | |
| C04B 14/06 | (2006.01) | |
| C04B 28/04 | (2006.01) | |
| C04B 111/00 | (2006.01) | |
| C09K 5/14 | (2006.01) | |
| C09K 8/467 | (2006.01) | |
| E21B 17/00 | (2006.01) | |
| E21B 33/138 | (2006.01) | |

(52) U.S. Cl.
CPC .......... *C04B 14/024* (2013.01); *C04B 14/06* (2013.01); *C04B 28/04* (2013.01); *C09K 5/14* (2013.01); *C09K 8/467* (2013.01); *E21B 17/003* (2013.01); *E21B 33/138* (2013.01); *C04B 2111/00146* (2013.01); *C04B 2111/00844* (2013.01); *C04B 2201/32* (2013.01)

(58) Field of Classification Search
CPC ....... C04B 14/024; C04B 14/06; C04B 28/04; C09K 5/14; C09K 8/467; E21B 17/003; E21B 33/138
See application file for complete search history.

(56) References Cited

U.S. PATENT DOCUMENTS

| | | | | |
|---|---|---|---|---|
| 4,361,661 | A * | 11/1982 | Jackson | ................... C08K 3/34 523/466 |
| 7,067,004 | B2 | 6/2006 | Matula | |
| 8,392,158 | B2 | 3/2013 | James | |
| 8,617,309 | B1 * | 12/2013 | Carney | ................... C04B 28/02 106/668 |
| 9,845,432 | B2 | 12/2017 | Rispoli | |
| 11,078,116 | B2 | 8/2021 | Zhang | |
| 2002/0044836 | A1 | 4/2002 | Caslini | |
| 2006/0054321 | A1 | 3/2006 | Szymanski | |
| 2012/0103611 | A1 | 5/2012 | Brandl | |
| 2012/0205577 | A1 | 8/2012 | Reddy | |
| 2013/0015322 | A1 | 1/2013 | Kusuda | |
| 2013/0153221 | A1 | 6/2013 | Loiseau | |
| 2017/0058181 | A1 | 3/2017 | Frantz | |
| 2019/0144734 | A1 | 5/2019 | Terrier | |
| 2020/0377415 | A1 * | 12/2020 | Nissinen | ................. C04B 14/28 |

FOREIGN PATENT DOCUMENTS

| | | | |
|---|---|---|---|
| CN | 108751870 A | 11/2018 | |
| EP | 2712853 A1 | 4/2014 | |
| WO | WO-2021076667 A1 * | 4/2021 | ............. C09K 8/467 |
| WO | 2023150452 A1 | 8/2023 | |
| WO | 2023183609 A1 | 9/2023 | |

OTHER PUBLICATIONS

International Search Report and Written Opinion issued in International Patent application PCT/US2023019258 on Aug. 7, 2023, 10 pages.
Ichim et al., Estimation of Cement Thermal Properties through the Three-Phase Model with Application to Geothermal Wells, 2018, 12 pages.
ASTM D5334: Standard Test Method for Determination of Thermal Conductivity of Soil and rock By Thermal Needle Probe Procedure, 2023, 10 pages.

* cited by examiner

*Primary Examiner* — Crystal J Lee
(74) *Attorney, Agent, or Firm* — Jeffrey D. Frantz

(57) ABSTRACT

Cementing compositions contain water, a cement and an additive for adjusting thermal conductivity. The additive for adjusting thermal conductivity may be graphite, graphene, aluminum oxide, hematite, copper metal, copper oxide, aluminum, amorphous carbon, gallium metal, iron metal, magnesium oxide, nickel metal, nickel oxide, tin metal, tin oxide, zinc metal or zinc oxide, or combinations thereof. Such compositions may have thermal conductivities exceeding 2 W/mK. Such compositions may be useful in closed loop geothermal completions or for encasing electrical cables.

13 Claims, 3 Drawing Sheets

THERMALLY CONDUCTIVE CEMENTS AND METHODS FOR USE THEREOF

CROSS-REFERENCE PARAGRAPH

This application is a National Stage Entry of International Patent Application No. PCT/US2023/019258, entitled "Thermally conductive cements and methods for use thereof," filed Apr. 20, 2023, which claims the benefit of U.S. Provisional Application No. 63/363,357 entitled "Thermally conductive cements and methods for use thereof," filed Apr. 21, 2022, the disclosure of which is incorporated herein by reference in its entirety.

BACKGROUND

The statements in this section merely provide background information related to the present disclosure and may not constitute prior art.

Geothermal Heat Transfer Loops

Heat transfer loops may be placed in the earth to provide for the heating and cooling of residential and commercial spaces. Since ground temperatures are generally similar to room temperatures in buildings, the use of such heat transfer loops can be cost effective alternatives to conventional heating and cooling systems. The installation of such heat transfer loops involves inserting a continuous loop of pipe connected to a heat pump unit into a hole or series of holes in the earth to act as a heat exchanger. A thermally conductive grout is then placed in the hole between the pipe wall and the earth. A heat transfer fluid can be circulated through the underground heat transfer loop to allow heat to be transferred between the earth and the fluid via conduction through the grout and the pipe wall.

FIG. 1 shows a schematic of a system that can deliver a grout to a downhole location for grouting the annulus between a heat transfer loop and a subterranean formation. The system 1 may include a mixing tank 10, in which the grout is prepared. The grout fluid may be conveyed via line 12 to pump 20, and finally to tremie line 16 extending into the wellbore 22 in a subterranean formation 18. The tremie line extends into an annulus 14 formed between the subterranean formation and the heat transfer loop 24. The heat transfer loop 24 may be a loop with a U-shaped bottom, an S-configuration, an infinity shaped configuration, or any other configuration capable of circulating fluid therein. The heat transfer loop 24 may be connected to a circulating pump at the surface.

Such heat transfer loops may also be applied in geothermal wells. Projects to extract geothermal energy exist throughout the world. Virtually any location with thermal anomalies is a potential site for geothermal well drilling. Some of the more notable geothermal projects are located in California, Utah and New Mexico, USA; Mexico; Central America; The Philippines; Indonesia; New Zealand; Kenya; Iceland; and Italy. Most geothermal plants are configured as shown in FIG. 2. Superheated formation water 201 that lies above the geothermal formation is produced to the surface whereupon it is "flashed" into steam. The steam is used to power turbines that generate electrical power. The spent water 202 is injected back into the reservoir, not for replenishment, but for environmental reasons. The formation waters are often highly saline, corrosive and contain toxic heavy metals. Another plant design, called "Hot Dry Rock (HDR)," is employed in regions where no geothermal formation waters exist. Two intersecting wells are drilled into the hot formation. Water from the surface is pumped down one well and becomes superheated. The superheated water is then produced out of the other well and flashed into steam.

Replacing the conventional geothermal well system with a closed heat transfer loop exemplified by FIG. 1 eliminates the need to produce superheated fluids, avoiding the environmental and waste disposal issues described above.

Efficient heat transfer may be accomplished by employing a grout or cement system that is more thermally conductive than conventional designs employed in well cementing applications.

Encasing Electrical Cables

Underground electrical cables are becoming increasingly popular. This approach has several advantages related to aesthetics and the protection of landscapes, as well as for increasing the level of protection of electrical supply networks in case of severe weather conditions.

Burying electrical cables brings some technical challenges, the main one being heat dissipation. Indeed, especially in the case of high voltage electrical cables, the heat generated by the cable can be significant. In the case of aerial cables, the high volume of moving air that surrounds the cables is able to efficiently dissipate this heat. In the case of underground cables, heat must be allowed to dissipate, as the build-up of heat would result in physical degradation of the structure that surrounds the electrical cables.

Several methods are currently used for the underground installation of electrical cables. The simplest is the direct burial of the cables. This method, where the cables are directly laid in a trench and covered by soil, is easy and inexpensive to implement. However, the electrical cables are not well protected by any casing, and heat may not be dissipated adequately. This approach is suitable for low voltage electrical cables. Another method, called semi-direct burial, includes encasing the electrical cables in flexible plastic conduits, typically made of high-density polyethylene (HDPE). This approach increases the level of protection of the underground cable, but is not suitable for high voltage cables, because of the low level of physical protection and because excess heat cannot be dissipated adequately.

Another method is to encase the electrical cables in concrete, which entirely surrounds the cables. Concrete, through adaptations of its composition, has the advantage of being a very versatile material, as it may provide excellent physical protection and/or enable good heat dissipation.

Concrete is a very widely used construction material with high ultimate strength and excellent durability. Furthermore, the material is able to flow while in its fresh state, enabling it to be easily transported, pumped, and placed before the setting and hardening actually take place. In addition to aggregates and water, it also contains a hydraulic binder such as portland cement, which produces strength-forming phases by solidifying and curing in contact with water. Concrete based on portland cement clinker is thus one of the most important binders worldwide.

For applications related to underground electric cables, especially high voltage electric cables, the thermal resistivity, expressed in mK/W, or the thermal conductivity, expressed in W/mK, of the surrounding material are of interest. Cable surround materials of higher thermal resistivity prevent heat from being evacuated from the electrical cable to the surrounding ground. A current possible remedy to this is the use of electrical cables of larger diameter, which produce less heat as they have a lower electrical resistivity. However, the cost of such electrical cables is significantly higher. A cable surround material of lower thermal resistivity may allow cables of lower cost or smaller cross-section to be used. This may lead to lower amounts of raw materials needed for the cables, lower transportation costs and more straightforward cable laying.

Encasing underground electrical cables with concrete can be done in two ways: the fresh concrete is used to directly surround electrical cables, or the fresh concrete is used to surround the electrical cables that are placed in a plastic, such as PVC, tube.

An application for which underground electrical cables may be suited is related to offshore floating wind farms (FIG. 3). Floating wind turbines 301 may be grouped together and anchored to the ocean floor by mooring lines 302. Electricity from the turbines may be transmitted to a floating substation 303, from which an electrical cable 304 further transmits the electricity to a power station 305 located onshore. The electrical cable may be inside a container or cylinder, and the cement or grout may be placed in the cable/cylinder annulus. A section of the electrical cable may be placed underground.

SUMMARY

The present disclosure proposes cement compositions and methods for cementing closed-loop geothermal wells, and installing underground electrical cables.

In an aspect, embodiments relate to compositions. The compositions comprise water, a cement and an additive for adjusting thermal conductivity.

In a further aspect, embodiments relate to methods for cementing a subterranean well. A pumpable composition is prepared that comprises water, a cement and an additive for adjusting thermal conductivity. The pumpable composition is placed in the subterranean well, after which the composition sets and develops strength.

In a further aspect, embodiments relate to methods for installing electrical cables. A pumpable composition is prepared that comprises water, a cement and an additive for adjusting thermal conductivity. The electrical cables are encased by the pumpable composition, after which the composition sets and develops strength.

DETAILED DESCRIPTION

Figure 1:
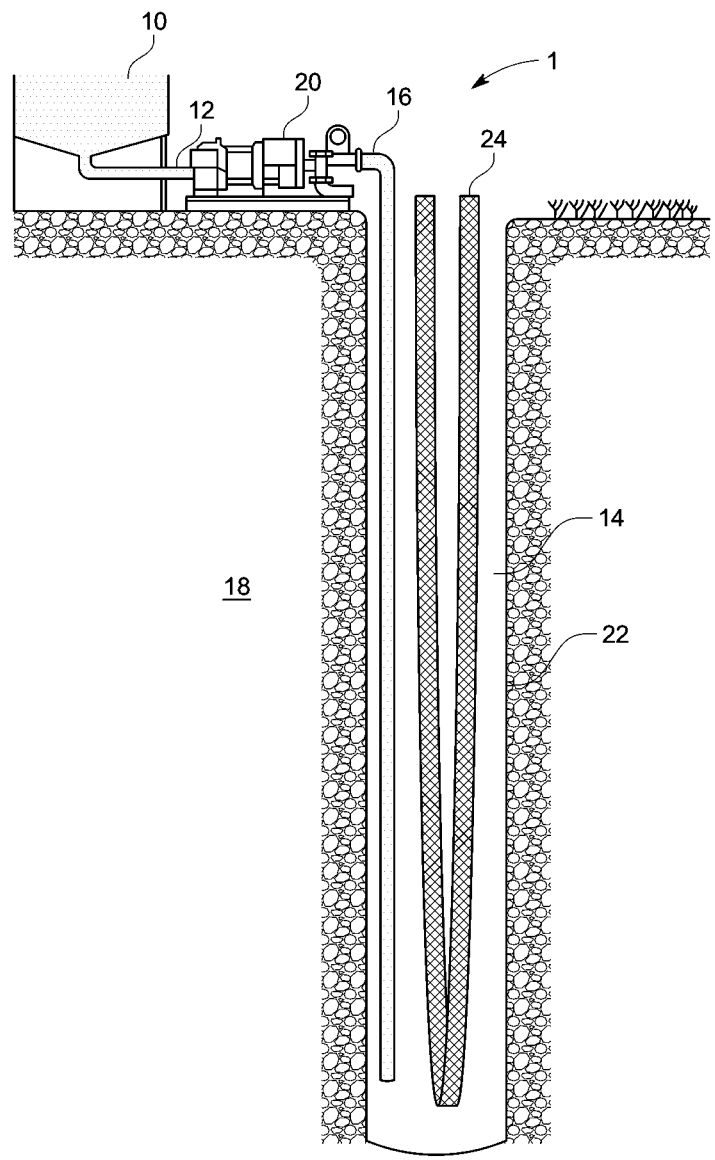
FIG. 1 shows a schematic of a system that can deliver a grout to a downhole location for grouting the annulus between a heat transfer loop and a subterranean formation.
Figure 2:
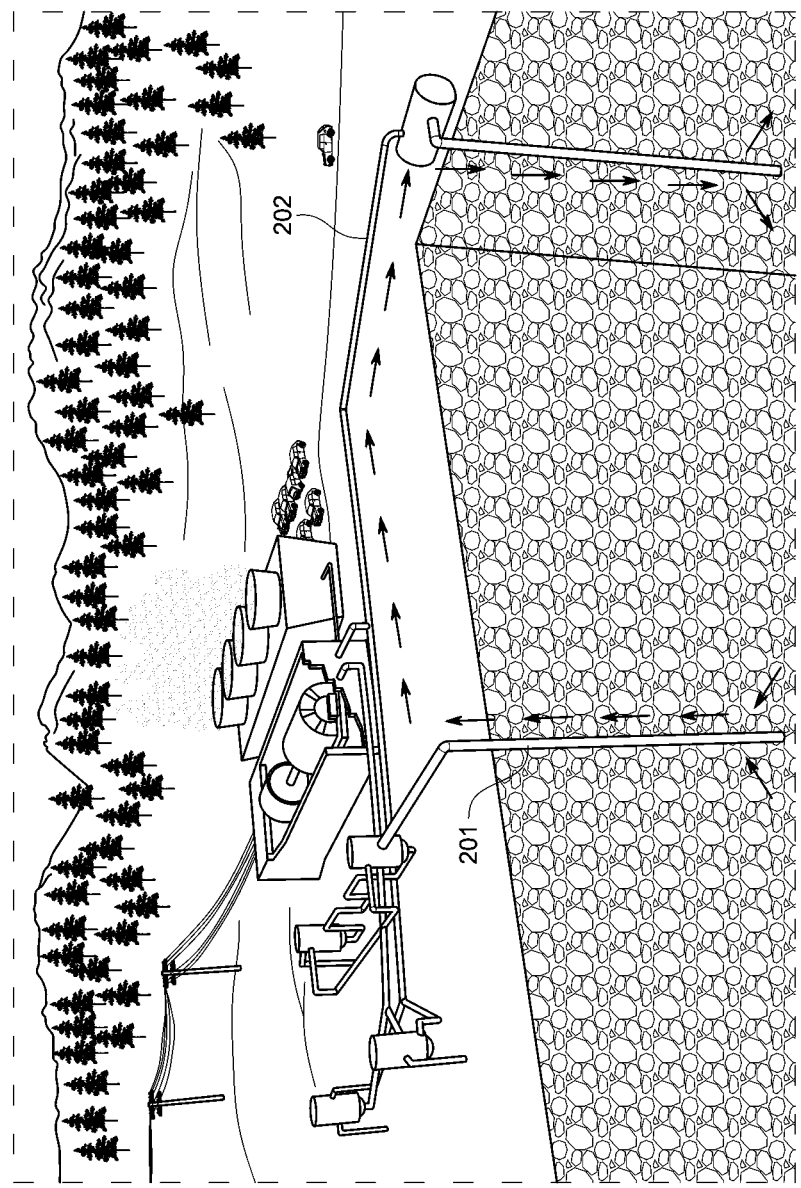
FIG. 2 is an illustration of a conventional geothermal power generation system.
Figure 3:
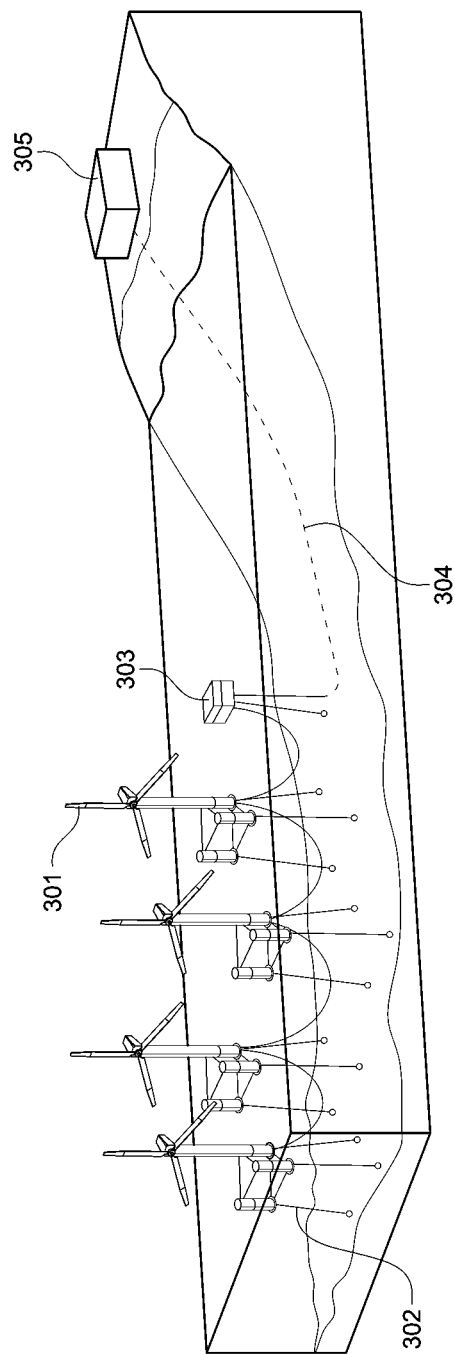
FIG. 3 is an illustration of an offshore windmill installation wherein the generated power is transmitted to an onshore power station.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

As used herein, "embodiments" refers to non-limiting examples disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

Moreover, the schematic illustrations and descriptions provided herein are understood to be examples only, and components and operations may be combined or divided, and added or removed, as well as re-ordered in whole or part, unless stated explicitly to the contrary herein.

In an aspect, embodiments relate to compositions. The compositions comprise water, a cement and an additive for adjusting thermal conductivity.

In a further aspect, embodiments relate to methods for cementing a subterranean well. A pumpable composition is prepared that comprises water, a cement and an additive for adjusting thermal conductivity. The pumpable composition is placed in the subterranean well, after which the composition sets and develops strength.

In a further aspect, embodiments relate to methods for installing electrical cables. A pumpable composition is prepared that comprises water, a cement and an additive for adjusting thermal conductivity. The electrical cables are encased by the pumpable composition, after which the composition sets and develops strength. The present disclosure is not limited to cables that may be installed underground. Scenarios where cables are lying on an ocean floor or floating in water are also envisioned.

For all aspects, the additive for adjusting thermal conductivity may comprise graphite, graphene, silicon carbide, aluminum oxide, hematite, copper metal, copper oxide, aluminum, amorphous carbon, gallium metal, iron metal, magnesium oxide, nickel metal, nickel oxide, tin metal, tin oxide, zinc metal or zinc oxide, or combinations thereof.

The additive for adjusting thermal conductivity may be present in the composition at a concentration between 0.1% and 75% by weight of cement (BWOC), or between 25% and 45% BWOC, or between 5% and 30% BWOC. For graphite, the concentration may be between 5% and 30% BWOC. For silicon carbide, the concentration may be as high as 75% BWOC.

The composition, once cured and hardened, may have a thermal conductivity greater than 2 W/mK, between 3 W/mK and 100 W/mK, or between 5 W/mK and 8 w/mK.

The composition may have a density between 10 lbm/gal and 20 lbm/gal (1200 and 2400 kg/m$^3$), or between 10 lbm/gal and 17 lbm/gal (1200 and 2040 kg/m$^3$).

The composition may further comprise silica. The silica may be present at a concentration between 0.1% and 100% BWOC, or between 35% and 60% BWOC, or between 40% and 60% BWOC. Silica may be present in the composition to prevent strength retrogression when the composition is cured at temperatures exceeding 110° C. (230° F.).

The additive for adjusting thermal conductivity may have a particle size between about 50 µm and 470 µm, or between 170 µm and 470 µm.

In some embodiments, the composition may have a multimodal particle size distribution comprising at least two sets of particles with different sizes. For example, the composition may be trimodal, comprising fine, medium and coarse particles. Such compositions are available from Schlumberger under the general name CemCRETE™. In such compositions, the additive for adjusting thermal conductivity may be present in any of the three particle-size categories.

The additive for adjusting thermal conductivity may be in the form of particles, ribbons, fibers or flakes, or combinations thereof.

The composition may have a solid volume fraction (SVF) between about 30% and 50%, or between about 30% to 45%.

For all aspects, the cement may comprise portland cement, high alumina cement, lime/silica blends, fly ashes, blast furnace slags, bioash, metakaolin, kaolin, cement kiln dust, cement bypass dust or geopolymers, or combinations thereof.

For all aspects, the composition may be pumpable during the placement period. For example, the consistency of the composition may be lower than 70 Bearden units (Bc) throughout the placement period. The yield value (Ty) may be between 7 and 75 lbf/100 ft$^2$ during the placement period. The viscosity of the composition may be lower than about 1000 cP at a shear rate of 100 sec$^{-1}$ during the placement period. After placement, the composition may set and develop strength.

For all aspects, the composition may further comprise additives including accelerators, retarders, extenders, weighting agents, dispersants, fluid-loss additives, antifoam agents, defoamers, antisettling additives, or gases (e.g., air and nitrogen) or combinations thereof.

EXAMPLES

In the following examples, cement systems of varying thermal conductivity were prepared and tested. Thermal conductivity was determined by a method described by ASTM D5334-44: Standard Test Method For Determination of Thermal Conductivity of Soil and Soft rock By Thermal Needle Probe Procedure. A thermal conductivity meter from Thermtest Instruments was employed (TLS-100), and the 50-mm probe was used for all testing.

Example 1

As a comparative example, a cement slurry with the following composition was prepared: Class G cement+5% graphite by weight of cement (BWOC)+0.1% diutan gum (BWOC)+0.02 gal/sk sodium lignosulfonate retarder. The abbreviation "sk" refers to a 94-lb sack of portland cement. Sufficient water was added to achieve a solids volume fraction (SVF) of 41.5%. The slurry density was 15.8 lbm/gal (1900 kg/m$^3$).

The slurry was cured at a temperature of 60° C. (140° F.) for 72 hr. After hardening the thermal conductivity was measured to be 1.45 W/mK.

Example 2

A cement slurry with the following composition was prepared. Class G cement+20% graphite (BWOC)+0.1% diutan gum (BWOC)+0.02 gal/sk sodium lignosulfonate retarder. Sufficient water was added to achieve an SVF of 44.2%. The slurry density was 15.8 lbm/gal (1900 kg/m$^3$).

The slurry was cured at a temperature of 60° C. (140° F.) for 72 hr. After hardening the thermal conductivity was measured to be 2.81 W/mK.

Example 3

A cement slurry with the following composition was prepared. Class G cement+30% graphite (BWOC)+0.1% diutan gum (BWOC)+0.02 gal/sk sodium lignosulfonate retarder. Sufficient water was added to achieve an SVF of 46.3%. The slurry density was 15.8 lbm/gal (1900 kg/m$^3$).

The slurry was cured at a temperature of 60° C. (140° F.) for 72 hr. After hardening the thermal conductivity was measured to be 7.03 W/mK.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A composition, comprising:
water;
a portland cement;
a diutan gum;
a sodium lignosulfonate retarder; and
a graphite additive for adjusting thermal conductivity of the composition,
wherein the graphite additive comprises a multimodal particle size distribution comprising a particle size between 50 µm and 470 µm, wherein the graphite additive for adjusting thermal conductivity is present in the composition at a concentration between 5% and 30% by weight of the portland cement, and wherein the thermal conductivity of the composition is between 5 W/mK and 8 W/mK, a density of the composition is between 10 lbm/gal and 20 lbm/gal, and a solid volume fraction of the composition is between 30% and 50%.

2. The composition of claim 1, wherein the composition further comprises silica at a concentration between 0.1 wt % and 100 wt % by weight of the portland cement.

3. The composition of claim 1, wherein the multimodal particle size distribution comprises two or more sets of particles with different sizes.

4. The composition of claim 1, wherein the graphite additive for adjusting thermal conductivity comprises particles, ribbons, flakes, or combinations thereof.

5. The composition of claim 1, wherein the solid volume fraction is 30% to 45%.

6. A method for cementing a subterranean well, comprising:
   preparing the composition of claim 1;
   placing the composition in the subterranean well; and
   causing the composition to set and develop strength.

7. The method of claim 6, wherein the composition further comprises silica at a concentration between 0.1 wt % and 100 wt % by weight of the portland cement.

8. The method of claim 6, wherein the multimodal particle size distribution comprises two or more sets of particles with different sizes.

9. The method of claim 6, wherein the graphite additive for adjusting thermal conductivity comprises particles, ribbons, flakes, or combinations thereof.

10. A method for installing electrical cables, comprising:
    preparing the composition of claim 1;
    encasing the electrical cables with the composition; and
    causing the composition to set and develop strength.

11. The method of claim 10, wherein the composition further comprises silica at a concentration between 0.1 wt % and 100 wt % by weight of the portland cement.

12. The method of claim 10, wherein the multimodal particle size distribution comprises two or more sets of particles with different sizes.

13. The method of claim 10, wherein the graphite additive for adjusting thermal conductivity comprises particles, ribbons, flakes, or combinations thereof.

* * * * *